(12) United States Patent
Bergendahl et al.

(10) Patent No.: US 7,079,239 B2
(45) Date of Patent: Jul. 18, 2006

(54) OPHTHALMIC LENS TRANSPORTATION AND INSPECTION CELL

(75) Inventors: Marc Bergendahl, Jericho, VT (US); David Lewison, Larchmont, NY (US); Raymond H. Puffer, Jr., Watervliet, NY (US)

(73) Assignee: Bausch & Lomb Incorporated, Rochester, NY (US)

( * ) Notice: Subject to any disclaimer, the term of this patent is extended or adjusted under 35 U.S.C. 154(b) by 399 days.

(21) Appl. No.: 10/680,759

(22) Filed: Oct. 7, 2003

(65) Prior Publication Data
US 2005/0073677 A1 Apr. 7, 2005

(51) Int. Cl.
*G01N 21/01* (2006.01)
(52) U.S. Cl. .................................................. 356/244
(58) Field of Classification Search ...................... None
See application file for complete search history.

(56) References Cited

U.S. PATENT DOCUMENTS 5,443,152 A 8/1995 Davis ........................ 206/5.1
5,786,898 A * 7/1998 Fitzpatrick .................. 356/426

FOREIGN PATENT DOCUMENTS

| EP | 0686459 A2 | 12/1995 |
|---|---|---|
| WO | 95/04264 | 9/1995 |
| WO | 00/09981 | 2/2000 |
| WO | WO 03/016855 A1 | 2/2003 |

* cited by examiner

*Primary Examiner*—Tu T. Nguyen
(74) *Attorney, Agent, or Firm*—John E. Thomas

(57) ABSTRACT

A method and apparatus for an inspection cell that allows contact lenses to be presented in a known orientation to an operator or vision system for inspection. The cell can be tipped to allow the inspected lens to be placed into a known pick-cup location upon passing inspection, or if the lens does not pass inspection, it can be discarded. The placement or discarding of the lens can be readily automated by selecting the rate at which the cell is tipped.

13 Claims, 2 Drawing Sheets

OPHTHALMIC LENS TRANSPORTATION AND INSPECTION CELL

BACKGROUND OF THE INVENTION

1. Field of the Invention

The present invention pertains to inspection cells for optical devices, and more particularly, to inspection cells for contact lenses that are adapted for easy or automated removal of lenses from the cell.

2. Description of the Prior Art

Prior art inspection of contact lenses is typically conducted on individual contact lenses within a separate flat bottom glass cell by manually placing the contact lens within the cell. These prior art inspection processes typically require that the contact lenses be manually flattened onto the bottom of the cell, cosmetically inspected using a comparator device, and then manually removed. Accepted lenses are manually placed into a packaging machine for further processing. It should be noted that prior art devices exist that include a non-articulated cell with a concave depression, the term non-articulated as used herein refers to a lack of features that provide for simple removal of the contact lens from the cell, or the device that holds the cell in place. The lack of articulated features within cells used by prior art inspection devices prevents the convenient movement of the contact lens without moving the device that holds the contact lens. These prior art inspection devices also fail to provide a mechanism for automated removal of the contact lenses from the cell, and do not even provide a simplified manual removal means.

Contact lenses have typically been transported from location to location in trays or vials. These trays or vials could be automatically filled with contact lenses but singulating the lenses after transportation has proved to be a quite difficult process to automate.

From the foregoing discussion, it should be apparent that there remains a need within the art for an inspection cell that is articulated to enable automated, or a simplified manual process, for removing the contact lenses from the cell once inspection is complete. There also remains a need within the art for a device that allows for simplified singulating of lenses after they have been inspected.

SUMMARY OF THE INVENTION

The present invention addresses the shortcoming within the prior art by providing an inspection cell that allows contact lenses to be presented in an orientation that is known to an operator or vision system for inspection. The cell can be tipped to allow the inspected lens to be placed into a known pick up location upon passing inspection, or if the lens does not pass inspection, it can be discarded. The placement or discarding of the lens can be readily automated by selecting the rate at which the cell is tipped.

These and other objects of the invention are provided by an inspection cell for optical devices having a block of essentially optically transparent material with a bowl formed therein, a spillway integrated with the bowl, a retainer for holding the block via a pivot point that allows the block to tip and a lens holder within the spillway.

DETAILED DESCRIPTION OF THE INVENTION

Figure 1A:
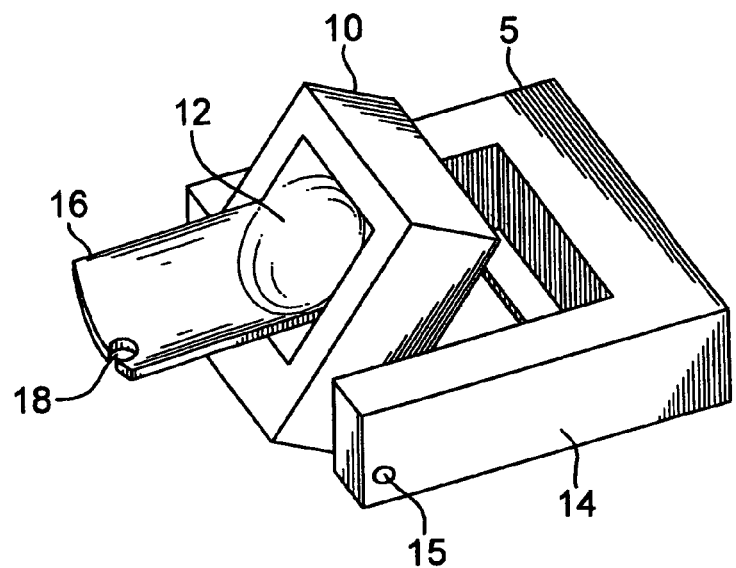
FIGS. 1a and 1b are perspective views of the cell of the invention.
Figure 1B:
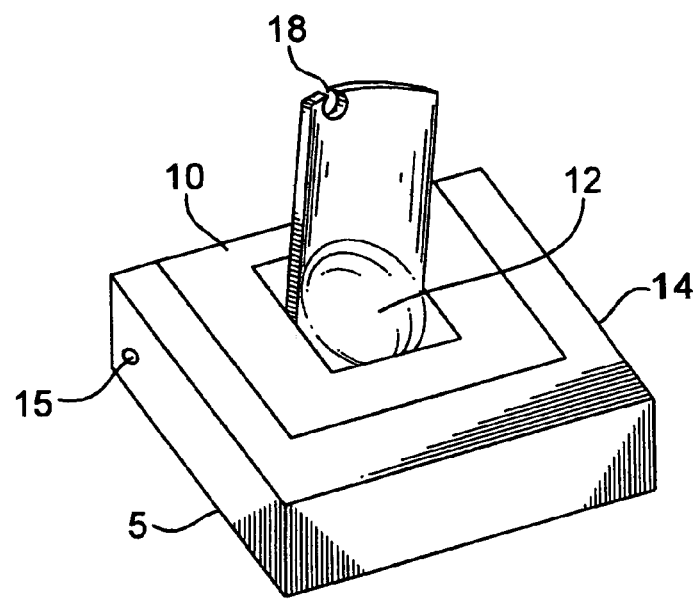

Referring to FIG. 1, a diagram of the water cell 5 of the invention that is designed to be filled with an appropriate amount of fluid, preferably water, the water cell 5 keeps a contact lens in a concave up position within a 20 mm diameter target area. Additionally, the water cell 5 of the invention is designed to take advantage of the relative densities of the fluid in the cell 5 (preferably water) and the material used to make the contact lenses to allow gravity to place the contact lens in the desired spot, or target area. The invention provides for the automatic return of a contact lens to the target area if the water cell 5 is disturbed during transportation of the water cell 5 or for any other reason. Once within the target area, incident light passing through the target area of the water cell 5 can be used to form an image the contact lens. The water cell 5 of the invention passes a sufficient amount of light (in terms of quantity and quality) to enable an image of the lens to be provided on a display screen to determine the lens quality. The water cell 5 of the invention is also capable of using two modes of operation for ejecting the lens after inspection. The ejection of a lens can be a complete, rapid ejection of unsatisfactory lenses or a slower, tipping of the water cell 5 for "good" lenses that are found to be satisfactory. The two modes allow lenses to be retrieved either manually or automatically. The water cell 5 of the invention allows for the provision of automated inspection devices that can discriminate between lenses that are found to be unsatisfactory and those lenses that are found to be satisfactory. Those lenses that are found to be unsatisfactory are disposed of by rapidly tipping the water cell 5, effectively discharging the unsatisfactory lens as the water flows out of the water cell 5. Those lenses that are found to be "good" or satisfactory, can be presented to a manipulator for final packaging by slowly tipping the water cell 5 and allowing the lens to be caught within a device articulated into the water cell 5.

The water cell 5 of the invention, as illustrated in FIG. 1, has various pieces that are required to perform the tasks previously described. A glass block 10 is formed, having an approximately 2 inch surface diameter bowl formed in the block 10. The bowl 12 can have a spherical or an aspherical shape. It has been found that a spherically shaped bowl 12 will tend to disperse light more than an aspherically shaped bowl 12, although both are specifically envisioned as useful embodiments of the present invention. Bowl 12 is formed within glass block 10 by conventional grinding processes. The glass used to form glass block 10 is preferably an optical quality glass, however, optical quality plastics and acrylics could also be used. The bowl 12 is filled with water during inspection. The lens is placed into the bowl 12 and becomes essentially centered in the bottom of the bowl 12 due to gravitational forces. As the lens sinks to the bottom of the bowl 12 it becomes centered and the water cell 5 assures the lens's proper placement within a 20 mm target area. Any lens displacement that occurs during movement of the water cell assembly is corrected within a few seconds as the lens settles back into the bottom of the bowl 12. Mated to the block 10 is a spillway 16. The spillway 16, as shown in FIG. 1, is designed to provide a seamless transition from the bowl 12 through which the lens and water can flow when the water cell 5 is tipped. At the end of the spillway is a pick-cup 18. The pick cup 18 is used as a position to present an accepted lens to a manipulator for transport to final packaging. When the water cell 5 is moved, depending upon the speed and total angular displacement of the water cell, the lens can either be thrown out of the bowl 12 via the spillway 16 with the water or strained out into the pick-cup 18 where a slot allows the lens to be grasped by a manual or an automated tweezer. The block 10 is held within a retaining device 14 via a pivot point 15 that allows the block to tip.

The bowl 12 has a profile that is chosen to accommodate the desirable characteristics of rapid settling behavior for a small diameter bowl and the desirable optical characteristics of a large diameter bowl. Preferably, the bottom of the block 10 has a plano-convex lens formed within it. This plano-convex lens is sized to correct for any optical distortion caused by the bowl 12 to water interface. The preferred embodiment will employ the bowl 12 that contains a plano-convex lens, however, it is specifically envisioned that the bottom on the block 10 can remain flat and an external lens can be used to correct for anticipated optical distortions instead of forming the plano-convex on the bottom of the block 10.

Figure 2:
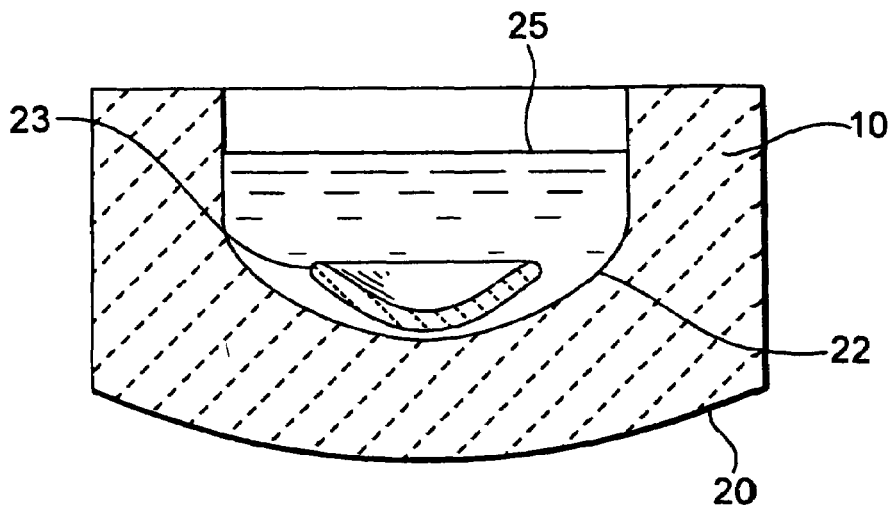
FIG. 2 is a cross sectional view illustrating a contact lens in the inspection cell of the invention.

FIG. 2 is a cross-sectional drawing of the block 10 illustrating the liquid level 25 and lens 23 resting on the bottom of bowl 12. The bottom of bowl 12 is formed into a curved surface 22. Additionally, the bottom of block 10 has a curvature 20. It is specifically envisioned that curved surface 22 can function as a lens to correct for anticipated optical distortions. It is further envisioned that curvature 20 can also function as a lens alone or in combination with curved surface 22. Alternatively, if the bottom of block 10 is not a curved surface but a flat surface instead, the bowl 12 will have a tendency to disperse light, which is an undesirable effect but can be corrected with an external lens. Preferably, the optical characteristics of the inspection system will allow light to pass through the water cell 5 such that the light is collimated as it becomes incident upon the lens within the water cell 5. Curved surface 22 and curvature 20 are preferably designed to provide optical effects that compensate for refractive differences between the liquid (which is preferably water) and the material used to form block 10.

Figure 3A:
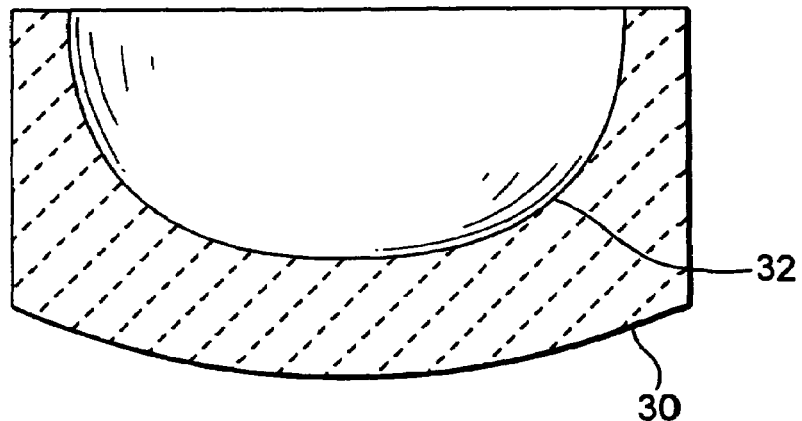
FIG. 3a and FIG. 3b are cross sectional views of two alternative bowl shapes that can be used in accordance with the invention.
Figure 3B:
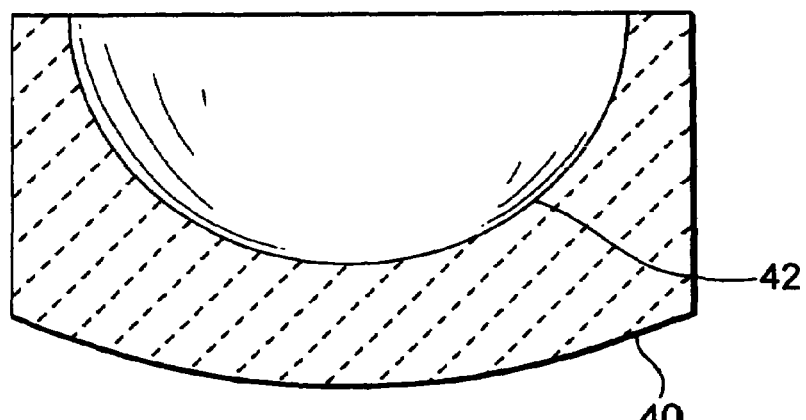

FIGS. 3a and 3b illustrate two additional examples of preferred embodiments having differently shaped bowls illustrative of the corresponding shapes to the plano-convex lenses that can be incorporated into the bottom of the glass water cell 5. FIG. 3a has an aspherical bowl 32 formed within block 30 and the bottom of block 30 has an aspherical shape. FIG. 3b illustrates a spherical bowl 42 formed within block 40 and the bottom of block 40 having an aspherical shape.

The new water cell provides the ability to create inspection systems that can convey, inspect and dispense a lens in an automatic fashion without manual user intervention. The cell is designed such that the spherical or aspherical indentation both accommodates automatic centering upon settling and a clear optical path for inspection. The spillway 16 and pick-cup 18 are configured such that with proper selection of tipping speed and amount, a lens can be completely evacuated from the cell or accurately presented to a robotic manipulator for further processing.

It is envisioned that the inspection systems that will be used with water cell 5 be specifically designed to accommodate the features that are be provided by water cell 5 of the present invention. Inspection systems used with the water cell 5 are provided with an opportunity to view a three dimensional image of the contact lens as it rests within the water cell 5. It is known that applying a narrow aperture to a lens increases the depth of field that can be obtained in imaging systems. Inspection systems are specifically envisioned that can be used with the water cell 5 of the invention that allow the contact lens to be measured as a true three-dimensional object. The three-dimensional images of the contact lens in the target area can be made by applying a collimated beam of light to the water cell 5 containing the contact lens, focusing the light that emerges through the water cell 5 with a lens having a narrow aperture and then reflecting the light from the lens with a narrow aperture towards a display screen. The bottom of the block 10 can have a curvature or can be flat with an external lens used to compensate for the change in refractive indices from glass to water.

The inspection cell containing the lens is either presented to a vision system or a lens inspector to determine if the lens is cosmetically acceptable. If the lens is deemed to be "good", the inspection cell is slowly rotated about the pivot point so that the lens is carried down the spillway and becomes lodged in the "lens pocket" at the end of the spillway. A robotic actuator then removes the lens from the lens pocket and places it into the next process stage (such as a blister package).

The foregoing discussion describes the embodiments most preferred by the inventors. Variations of these embodiments will be readily apparent to those skilled in the art. Accordingly, the scope of the invention should be measured by the appended claims.

What is claimed is:

1. An inspection cell for optical devices comprising:
   a block of optically transparent material having a concave bowl and a spillway formed in an exterior surface thereof, said spillway integrated with the bowl; and
   a retainer for holding the block via a pivot point that allows the block to tip.

2. The inspection device of claim 1 further comprising a lens cup disposed at an end of the spillway for holding a lens.

3. The inspection device of claim 2 wherein the lens cup comprises a slot to expose a portion of an edge of the lens.

4. The inspection device of claim 1 wherein the block is made of optical glass.

5. The inspection device of claim 1 wherein the bowl has a concave aspheric shape and an opposed exterior surface has a convex aspheric shape.

6. The inspection device of claim 1 wherein the bowl has a concave spherical shape and an opposed exterior surface has a convex aspheric shape.

7. The inspection device of claim 1 wherein the bowl further comprises a lens incorporated into the bowl.

8. The inspection device of claim 1 wherein the block is made of optical acrylic.

9. A method for inspecting lens comprising the steps of:
   providing a block of optically transparent material having a concave bowl and a spillway formed in an exterior surface thereof, said spillway integrated with the bowl;
   pivotally mounting the block within a retainer that allows the block to tip;
   filling the bowl with a fluid;
   placing a lens in the bowl; and
   tipping the bowl to empty the fluid and the lens.

10. The method of claim 9 wherein the step of providing further comprises providing a lens holder within the spillway.

11. The method of claim 10 wherein the step of tipping further comprises tipping the block at a rate such that the lens is caught within the lens holder.

12. The method of claim 10 wherein the step of tipping further comprises tipping the block at a rate such that the lens spill out the spillway without being caught by the lens holder.

13. The method of claim 10 wherein the step of tipping further comprises selectively tipping the block at a rate to alternatively catch the lens within the lens holder or not catch the lens within the lens holder in accordance with a signal that identifies the lens as either satisfactory or not satisfactory, respectively.

* * * * *